United States Patent
Yang et al.

(10) Patent No.: US 7,827,652 B2
(45) Date of Patent: Nov. 9, 2010

(54) WINDSCREEN WIPER STRUCTURE

(76) Inventors: Chih-Ming Yang, Room 4E-17, No. 5, Sec. 5, Sinyi Rd., Taipei City (TW); Chuan-Chih Chang, Room 4E-17, No. 5, Sec. 5, Sinyi Rd., Taipei City (TW)

( * ) Notice: Subject to any disclaimer, the term of this patent is extended or adjusted under 35 U.S.C. 154(b) by 941 days.

(21) Appl. No.: 11/705,014

(22) Filed: Feb. 12, 2007

(65) Prior Publication Data
US 2008/0163448 A1 Jul. 10, 2008

(30) Foreign Application Priority Data
Jan. 10, 2007 (TW) .............................. 96200503 U

(51) Int. Cl.
*B60S 1/40* (2006.01)
*B60S 1/38* (2006.01)

(52) U.S. Cl. ............. 15/250.32; 15/250.43; 15/250.201

(58) Field of Classification Search ............ 15/250.201, 15/250.32, 250.43, 250.361, 250.451, 250.44
See application file for complete search history.

(56) References Cited

U.S. PATENT DOCUMENTS

| | | | | |
|---|---|---|---|---|
| 7,299,520 B2 * | 11/2007 | Huang | ..................... | 15/250.32 |
| 7,621,016 B2 * | 11/2009 | Verelst et al. | ............ | 15/250.32 |
| 2004/0181894 A1 * | 9/2004 | Lee et al. | ................ | 15/250.201 |
| 2007/0289079 A1 * | 12/2007 | Van Bealen | .............. | 15/250.32 |

FOREIGN PATENT DOCUMENTS

| EP | 1491416 | * 12/2004 |
|---|---|---|
| WO | 2005/102802 | * 11/2005 |

* cited by examiner

*Primary Examiner*—Gary K Graham
(74) *Attorney, Agent, or Firm*—Rosenberg, Klein & Lee

(57) ABSTRACT

A windscreen wiper structure includes a supporting object, a windscreen wiper strip, and a connecting device. The windscreen wiper strip fixes to the supporting object's lower surface. The connecting device includes a center stand, a hook stand, an outer housing, and a lid body. The center stand fixes in the middle of the supporting object's upper surface. The center stand has an axle. The hook stand has a pivoting hole. The hook stand's pivoting hole connects to the axle. The outer housing disposes in the center stand's exterior. There is an opening hole in the outer housing's upper part. A piercing hole sets in the lid body's upper part. One end of the lid body pivotally connects to the outer housing. The lid body opens or closes with the outer housing's opening hole. Hence, the connecting device and the windscreen wiper strip joins together quickly, making assembly and disassembly easier.

9 Claims, 7 Drawing Sheets

WINDSCREEN WIPER STRUCTURE

BACKGROUND OF THE INVENTION

1. Field of the Invention

The present invention relates to a windscreen wiper structure, and particularly relates to a windscreen wiper structure joined to a U-shaped windscreen wiper arm of a vehicle for easy assembling and disassembling.

2. Description of the Related Art

A windscreen wiper is usually disposed in the front or back windscreen of a vehicle for wiping off the rain or dirt that is upon the windscreen thereby avoiding blocking the vision of the driver which may lead to danger.

The windscreen wiper of the prior art normally includes a supporting object, a connecting device, and a windscreen wiper strip. The connecting device is fixed in the middle of the upper surface of the supporting object. The windscreen wiper strip is fixed on the lower surface of the supporting object. The windscreen wiper can be installed on the windscreen wiper arm of a vehicle by using the connecting device for moving the windscreen wiper in tandem with the movements of the windscreen wiper arm. Hence, by using the windscreen wiper strip rain or dirt attached to the windscreen is wiper off.

A windscreen wiper arm formed in U shape is currently available in the current market. The join between the windscreen wiper arm and connecting device is complex. Assembling and disassembling the windscreen wiper arm requires a lot of time and effort and is inconvenient for users.

Furthermore, the aforementioned windscreen wiper strip normally uses a number of plastic buckles to fix to the supporting object (a flexible steel plate sheet). When the plastic buckles are used in cold regions of the world, cracks may easily occur. Therefore, the join between the windscreen wiper strip and the supporting object may slip and fall off. Thus, the windscreen wiper cannot be fixed firmly on to the supporting object.

SUMMARY OF THE INVENTION

One particular aspect of the present invention is to provide a windscreen wiper structure in which the join between the connecting device and the windscreen wiper arm is easy and convenient to assemble and disassemble.

Another particular aspect of the present invention is to provide a windscreen wiper structure in which the windscreen wiper strip can be fixed firmly on to the supporting object to avoid any falling or slipping of the join between the windscreen wiper strip and the supporting object.

In order to achieve the above-mentioned aspects, the present invention provides a windscreen wiper structure including a supporting object, a windscreen wiper strip fixed in the lower surface of the supporting object, and a connecting device, including a centre stand, a hook stand, an outer housing, and a lid body. The centre stand is fixed in the middle of the upper surface of the supporting object. The centre stand has an axle. A pivoting hole is disposed in the hook stand. The pivoting hole of the hook stand is pivotally connected to the axle of the centre stand. The outer housing covers the centre stand. An opening hole opens in the upper part of the outer housing. There is a piercing hole in the upper part of the lid body. One end of the lid body is pivotally connected to the outer housing. The lid body can open or close with the opening hole of the outer housing.

The present invention has the following advantages. There is an open-able lid body in the connecting device for hitching the hook part of the windscreen wiper's arm to the hook stand. Next, closing the lid body makes the windscreen wiper arm firmly hitch on to the hook stand. Hence, joining the windscreen wiper arm and the connecting device is made easier and assembly and disassembly is more convenient for users.

Furthermore, the windscreen wiper strip of the present invention is buckled to the supporting object using metallic buckles. No cracks will occur when using the metallic buckles in cold conditions, making the windscreen wiper strip firmly attached to the supporting object. Hence, any falling or slipping of the join between the windscreen wiper strip and the supporting object is avoided.

It is to be understood that both the foregoing general description and the following detailed description are exemplary, and are intended to provide further explanation of the invention as claimed. Other advantages and features of the invention will be apparent from the following description, drawings and claims.

DETAILED DESCRIPTION OF THE PRESENT INVENTION

Figure 1:
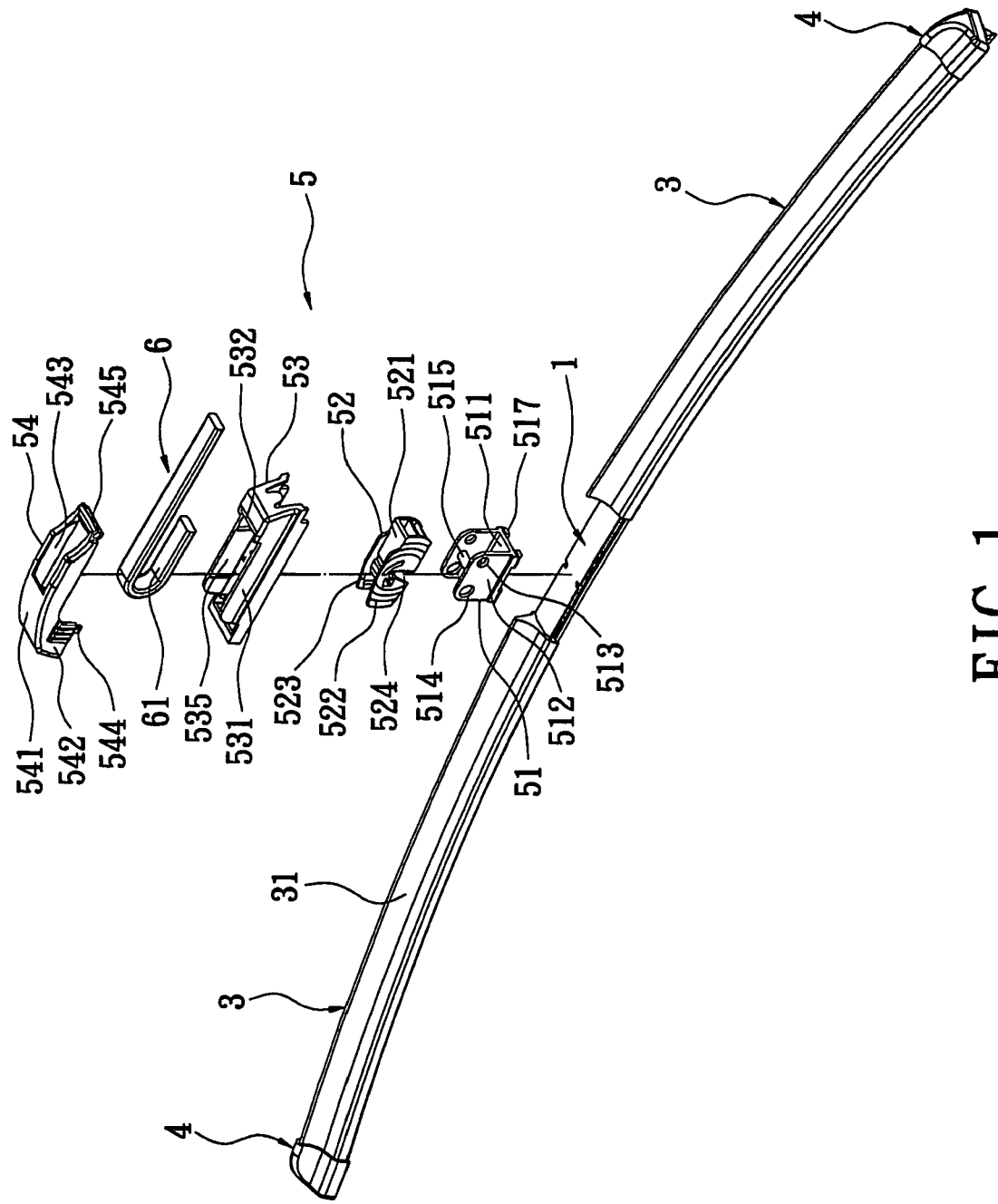
FIG. 1 is a three dimensional view of the windscreen wiper structure of the present invention.
Figure 2:
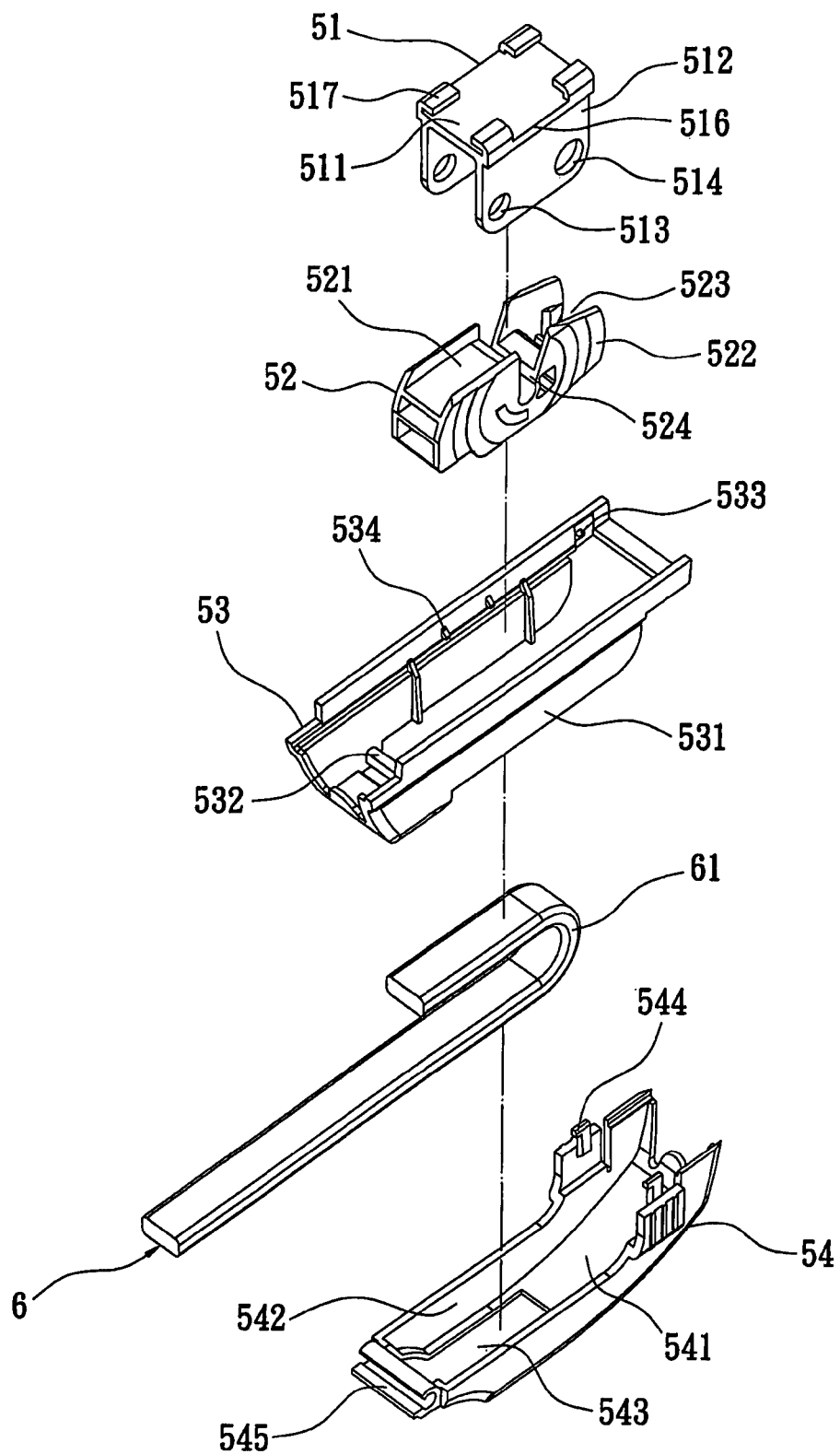
FIG. 2 is another angle of the three dimensional view of the connecting device of the windscreen wiper structure of the present invention.
Figure 3:
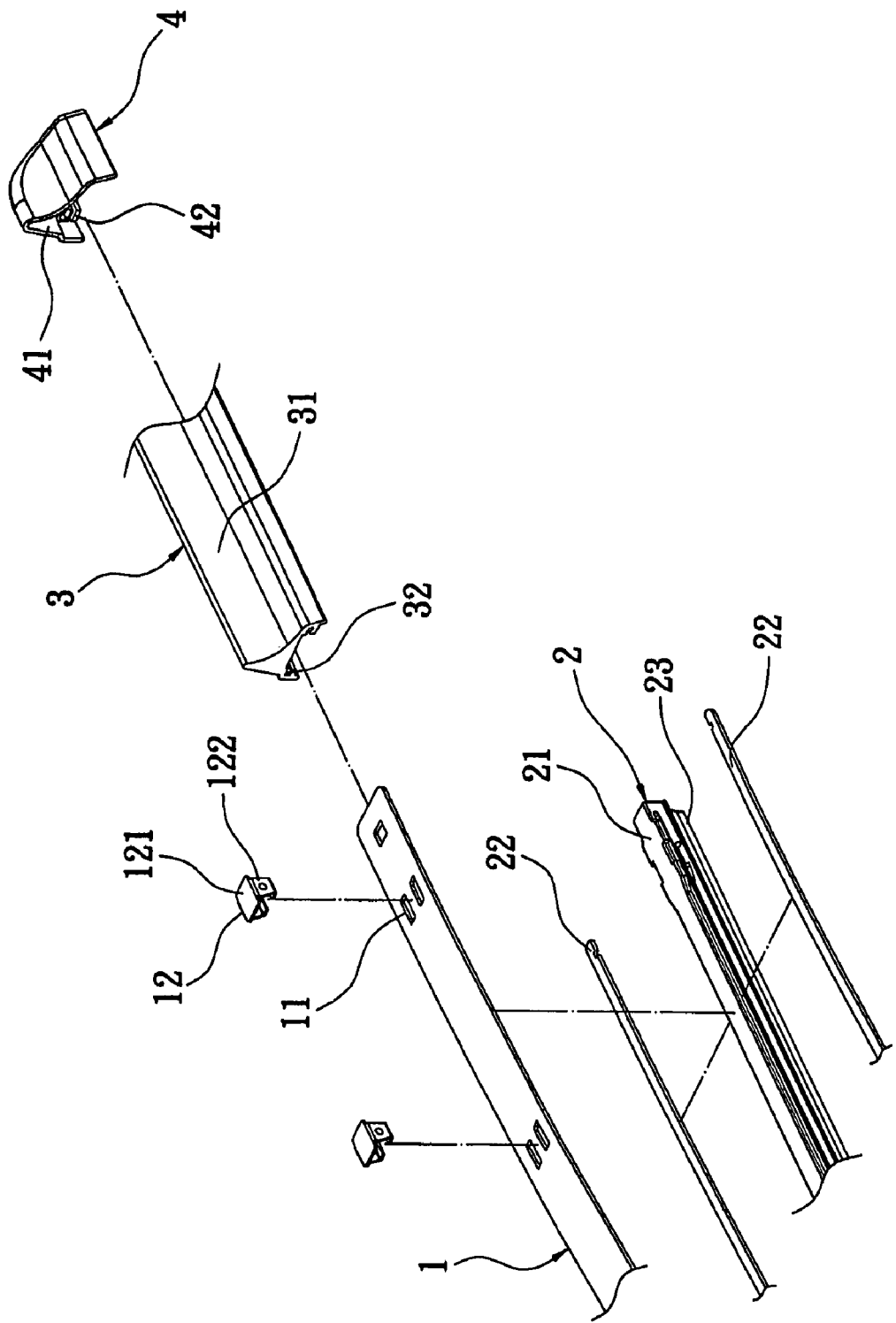
FIG. 3 is a three dimensional view of a part of the structure of the windscreen wiper structure of the present invention.
Figure 4:
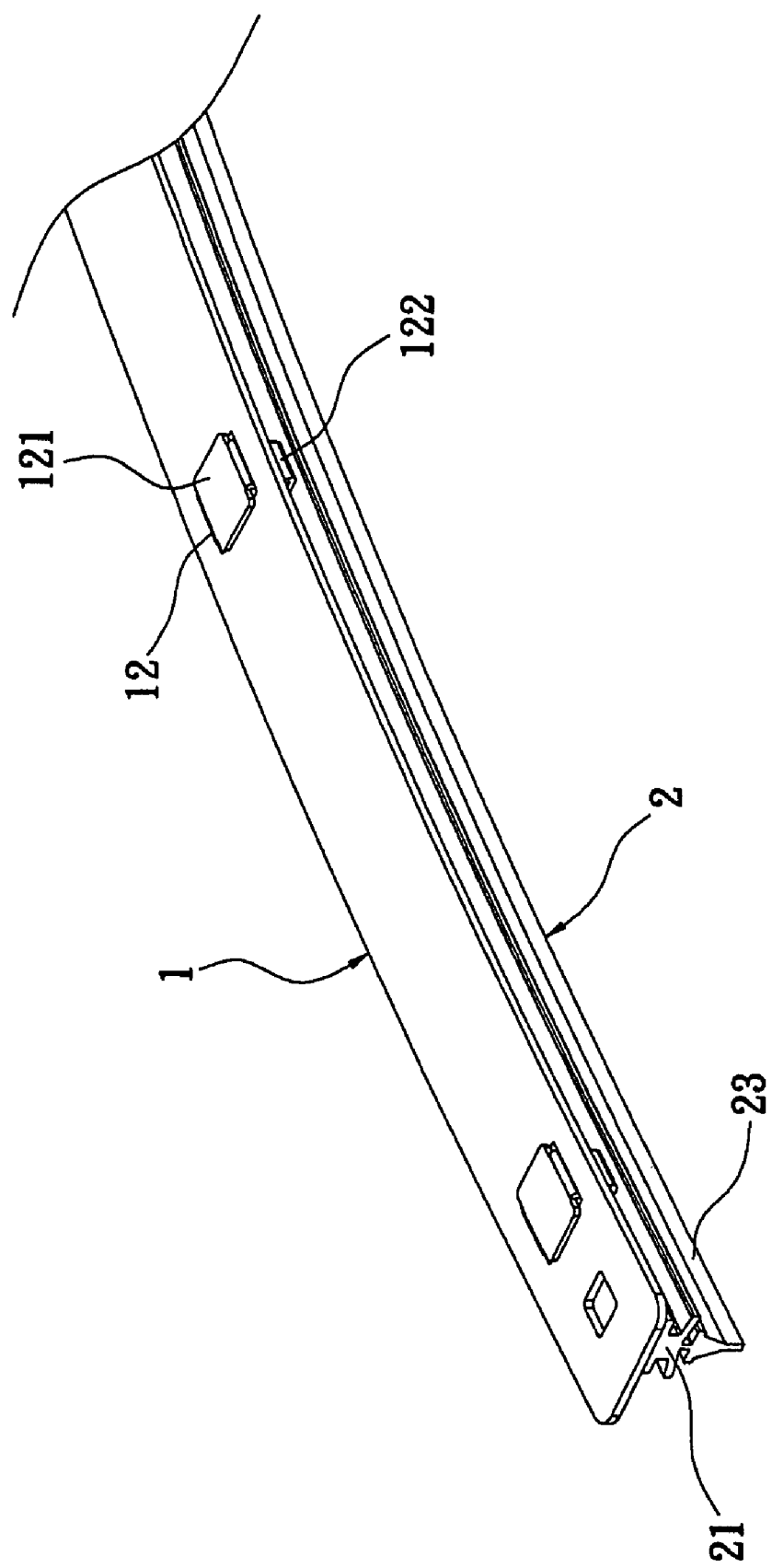
FIG. 4 is a three dimensional view of a part of the structure of the windscreen wiper structure of the present invention.
Figure 5:
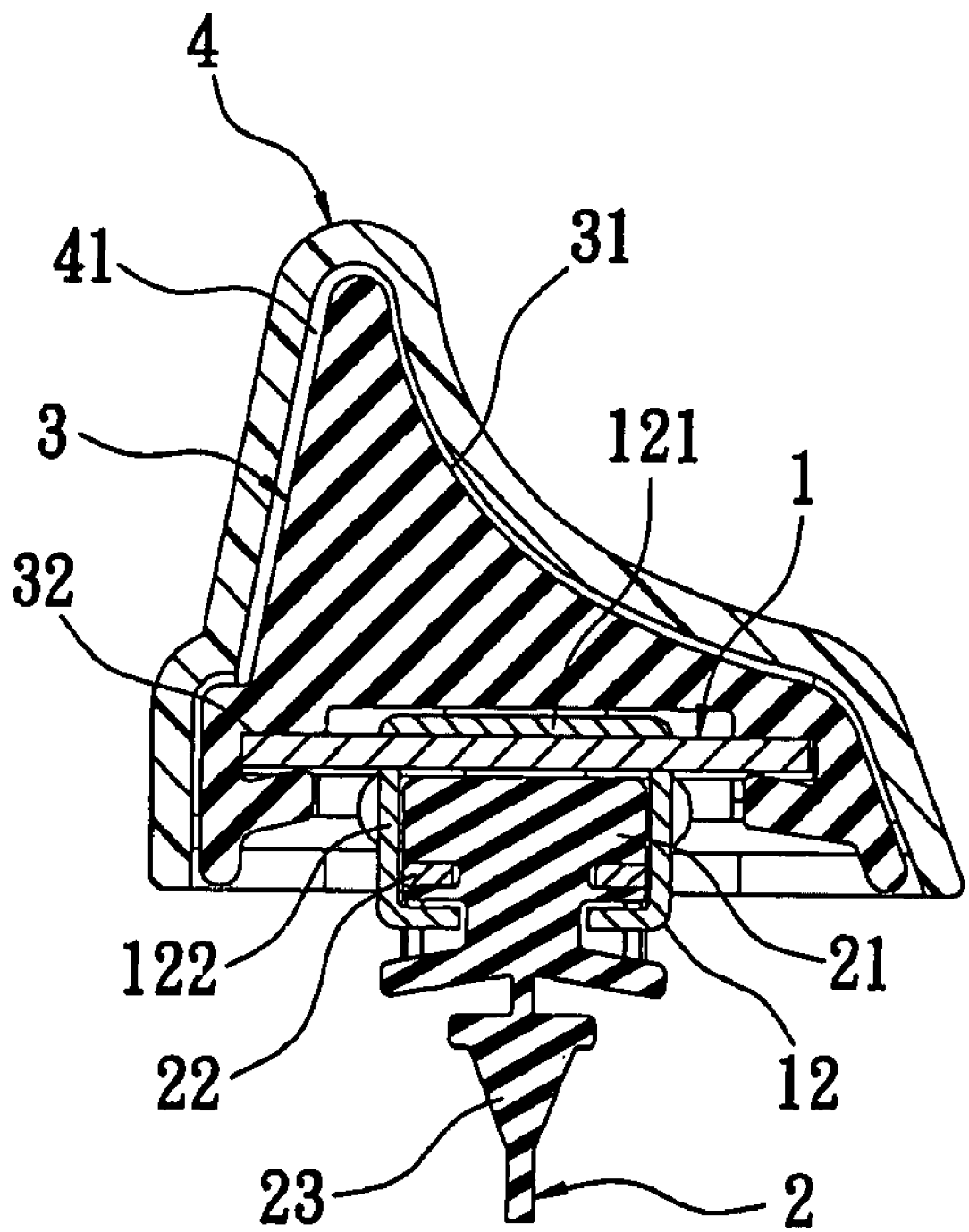
FIG. 5 is a three dimensional diagnostic view of the windscreen wiper structure of the present invention.

Please refer to FIGS. 1 to 5. The present invention provides a windscreen wiper structure including a supporting object 1, a windscreen wiper strip 2, two flexible objects 3, two end lids 4, and a connecting device 5. The supporting object 1 is a flexible steel plate sheet and is formed as a long strip and bended in an arc shape. On the top of the supporting object 1 a number of spaced piercing holes 11 are disposed in an equidistant manner. The corresponding piercing holes 11 penetrate through the upper and lower surface of the supporting object 1.

The windscreen wiper strip 2 is a rubber object formed as a long strip. There is a fixing part 21 on the upper end of the windscreen wiper strip 2. There are two embedded metallic strips 22 in the interior of the fixing part 21 for enhancing the strength of the fixing part 21. The lower end of the fixing part 21 extends down to form a scraping part 23. The scraping part 23 is formed as a triangular long strip.

The windscreen wiper strip is fixed to the lower surface of the supporting object 1 using a number of metallic buckles 12. Every metallic buckle 12 has an upper plate 121 and a buckle plate sheet 122 extending down from two corresponding sides of the upper plate 121. The upper plate 121 of the metallic buckles 12 is disposed on the upper surface of the supporting object 1 making the buckle plate 122 of the metallic buckles 12 penetrate through the corresponding piercing hole 11 on the supporting object 1 from top to bottom. Thus, the buckle plate sheet 122 of the metallic buckles 12 can be bent inwardly and buckled to the corresponding two sides of the fixing part 21 of the windscreen wiper strip 2. Therefore, the windscreen wiper 2 can be buckled and clipped firmly to the lower surface of the supporting object.

The two flexible objects 3 are rubber objects formed in long strip shape. On the outer rim of each of the two flexible objects 3 an arced surface 31 is formed. There is a clipping slot 32 established in each of the lower two sides of the two flexible objects 3. The two flexible objects 3 are disposed on the upper surface of the supporting object 1. The two flexible objects 3 are clipped to the two sides of the supporting object 1 by the clipping slot 32 making the two flexible objects 3 attach to the two sides of the connecting device 5 on the supporting object 1. The two flexible objects 3 can enclose the supporting object 1 and the metallic buckle 12 to visually enhance and protect the windscreen wiper strip 2. Also, the arced surface 31 of the two flexible objects 3 reduces wind resistance when the vehicle is moving and the supporting object 1 and the windscreen wiper strip are pressed down by utilizing the force of the wind resistance. This enhances the scrapping off of the rain and dirt by the scraping part 23 of the windscreen wiper strip 2.

The two end lids 4 are corresponding plastic objects. The two end lids 4 are formed in a hollow lid body. A placing space 41 is formed in the interior of each of the two end lids 4. Under each of the two sides of the placing space 41 a clipping slot 42 is opened. The two end lids 4 are clipped to the two ends of the supporting object 1 by the clipping slot 42 making the two end lids 4 cover the two ends of the supporting object 1. The end, which is furthest away from the connecting device 5 of the two flexible objects 3, is collected in the placing space 41 of the two end lids 4.

The connecting device includes a centre stand 51, a hook stand 52, an outer housing 53, and a lid body 54. The centre stand 51 includes a base plate 511 and two side plates 512 extending up from the two sides of the base plate 511. On each of the two side plates 512 there is a first piercing hole 513 and a second piercing hole 514. The internal diameter of the first piercing hole 513 is smaller than the internal diameter of the second piercing hole 514. An axle 515 is connected in parallel in the middle of the two side plates 512. A clip-buckle slot 516 is disposed on each of the two sides of the base plate 511. Two buckle-connecting plates 517 extend out from each of the two sides of the base plate 511. The centre stand 51 is disposed in the middle of the upper surface of the supporting object 1 and, by bending, it is buckled to the two sides of the supporting object 1 using the buckle-connecting plates 517. Thus the centre stand 51 is fixed on to the supporting object 1.

The hook stand includes a stand body 521 and two side parts 522 extending from the two sides of the stand body 521. A hitching space 523 is formed in the middle of the two side parts 522. The stand body 521 has a pivoting hole 524. The base of the pivoting hole 524 is formed as an opening hole. The pivoting hole 524 of the hook stand 52 is pivotally connected to the axle 515 of the centre stand 51. Therefore, the hook stand 52 can be pivotally connected to the middle of the two side plates 512 of the centre stand 51.

The outer housing 53 includes two side housings 531. One end of the two side housings 531 forms a pivoting axle 532. A first fixing buckle 533 protrudes from the inner wall of the other end of each of the two side housings 531. Two clip-buckle bodies 534 protrude from the inner walls of each of the two side housings 531. An opening hole 535 is formed in the middle of the two side housings 531. The opening hole 535 is located on the top of the outer housing 53. The outer housing 53 covers the exterior of the centre stand 51 and is clipped to the clip-buckle slot 516 of the two sides of the base plate 511 of the centre stand 51 by the clip-buckle bodies 534. Thereby, the outer housing 53 is to fixed on to the centre stand 51.

The lid body 54 includes an upper plate 541 and two side plates 542 extending down from the two sides of the upper plates 541. A piercing hole 543 opens on top of the upper plate 541. Two second fixing buckles 544 protrude from the two side plates 542 which correspond to the two first fixing buckles 533 of the outer housing 53. A pivot stand 545 is disposed on one end of the lid body 54. The pivot stand 545 of the lid body 54 is pivotally connected together to the pivoting axle 532 of the outer hosing 53 making one end of the lid body 54 pivotally connected to the outer housing 53. The lid body 54 can open or close to the opening hole 535 of the outer housing 53. When the lid body 54 is closed, the two second fixing buckles 544 can be buckled together with the two first fixing buckles 533. Hence, the lid body 54 can be closed firmly on top of the outer housing 53. According to the aforementioned composition, the windscreen wiper structure of the present invention is formed.

Figure 6:
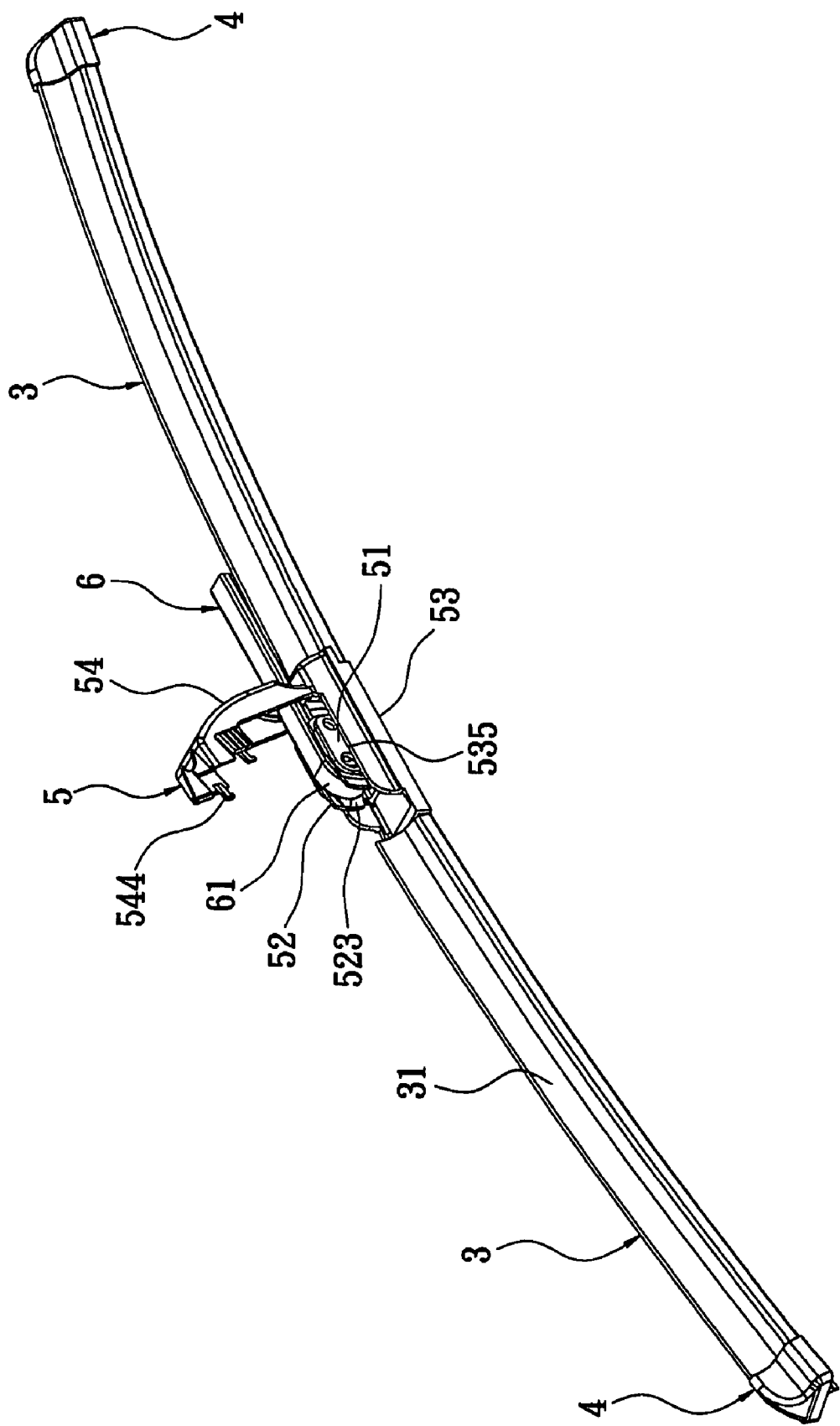
FIG. 6 is a three dimensional view of the lid body opening the windscreen wiper structure of the present invention.
Figure 7:
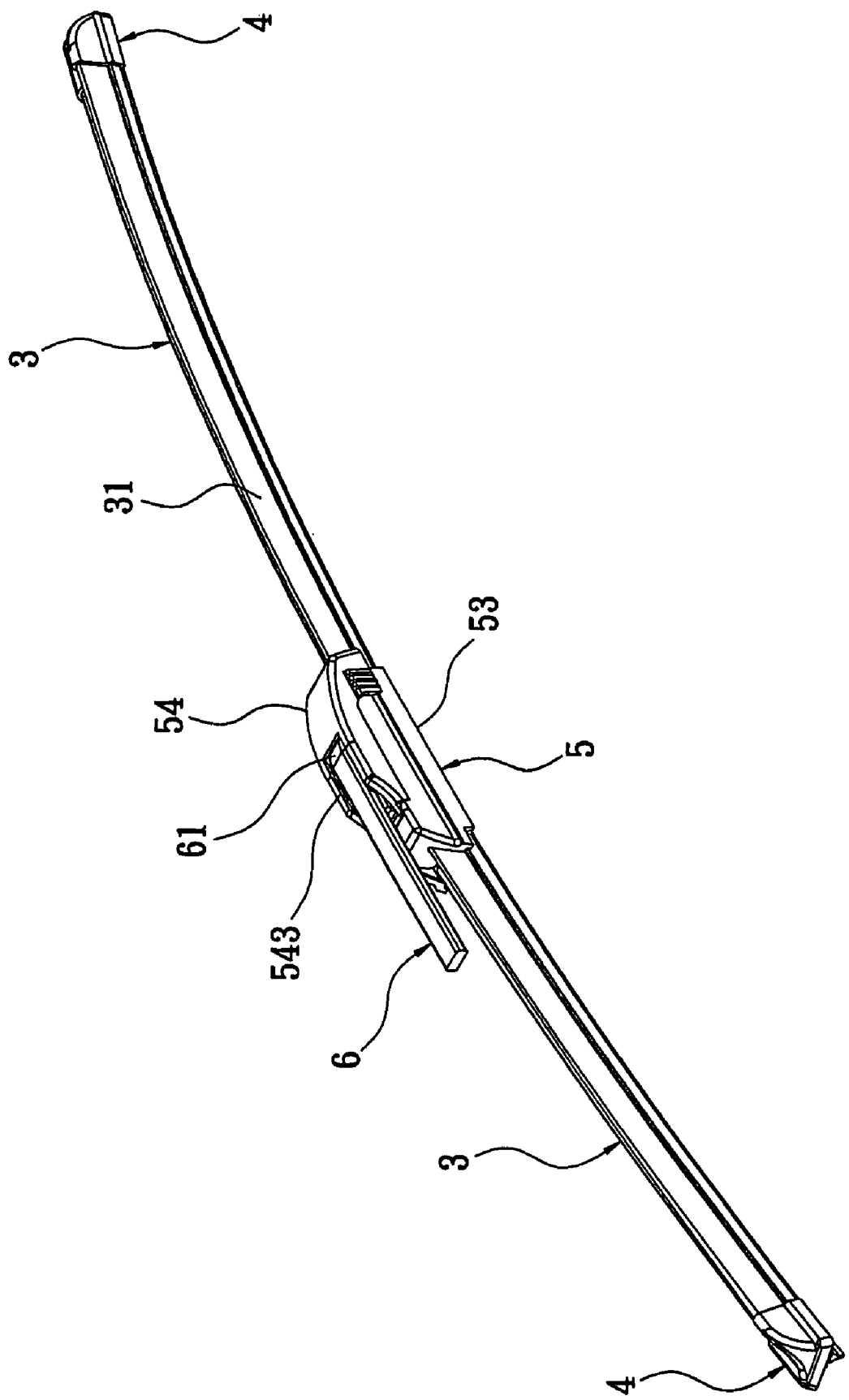
FIG. 7 is a three dimensional view of the lid body closing the windscreen wiper structure of the present invention.

Please refer to FIGS. 6 and 7. The windscreen wiper structure of the present invention can be joined to the U-shaped windscreen wiper arm using the connecting device 5. First, the lid body 54 opens and penetrates the hook part 61 of the windscreen wiper arm 6 from the piercing hole 543 on top of the lid body 54 to the lower part of the lid body 54, hitching the hook part 61 of the windscreen wiper arm 6 on the hook stand 52. The hook part 61 of the windscreen wiper arm 6 is hitched on the stand body 521 of the hook stand 52 and collected into the hitching space 523. Then, the lid body 54 is closed making the hook part 61 of the windscreen wiper arm 6 firmly hitch onto the hook stands 52. The windscreen wiper can be installed on the windscreen wiper arm 6 of a vehicle using the connecting device 5 making the windscreen wiper move according to the windscreen wiper arm 6. Hence, rain or dirt attached on the windscreen can be scraped off by the windscreen wiper strip 2.

The connecting device 5 of the present invention has an open-able lid body 54 so that the hook part 61 of the windscreen wiper arm 6 can be easily hitched onto the hook stand 52. Then the lid body 54 is closed making the hook part 61 of the windscreen wiper arm 6 hitch firmly onto the hook stands 52. Therefore, the join between the connecting device 5 and the windscreen wiper arm 6 is simpler and assembling and disassembling the windscreen wiper is easier.

The windscreen wiper strip 2 of the present invention is buckled to the supporting objective 1 using metallic buckles 12. No cracks will occur when the metallic buckles 12 are used in cold conditions. The windscreen wiper strip 2 is firmly fixed on to the supporting object 1. Thus, the falling and slipping of the join between the windscreen wiper strip 2 and the supporting object 1 is avoided.

Although the present invention has been described with reference to the preferred best molds thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A windscreen wiper structure, comprising:
   a supporting object having a plurality of spaced piercing holes formed therethrough;
   a windscreen wiper strip, fixed in a lower surface of the supporting object;
   a plurality of metallic buckles buckling the windscreen wiper strip to the supporting object, each of the metallic buckles having an upper plate and two buckle plates extending downwardly from two sides of the upper plate, the upper plate of each of the metallic buckles being disposed on an upper surface of the supporting object, and each of the buckle plates of each metallic buckle penetrates through a corresponding one of the plurality of piercing holes in the supporting object and buckles to two sides of the windscreen wiper strip; and a connecting device, the connecting device comprising:
- a centre stand being fixed in a middle of the upper surface of the supporting object and having an axle;
- a hook stand having a pivoting hole formed therein, the axle of the centre stand being received in the pivoting hole;
- an outer housing covering an exterior of the centre stand and having an opening hole formed in a top thereof; and
- a lid body removably covering the opening hole of the outer housing.

2. The windscreen wiper structure as claimed in claim 1, wherein the supporting object is a flexible metallic plate sheet bent in an arc shape.

3. The windscreen wiper structure as claimed in claim 1, wherein a top end of the windscreen wiper strip has a fixing part, a metallic strip is embedded on an interior of the fixing part, and a lower end of the fixing part extends down to form a scraping part.

4. The windscreen wiper structure as claimed in claim 1, wherein the centre stand includes a base plate and two side plates extending up from the two sides of the base plate, two side plates both have a first piercing hole and a second piercing hole, the axle is connected to a middle of the two side plates, a plurality of buckle-connect plates extend out from each of the two sides of the base plate of the centre stand, and the buckle-connect plates are buckled to two sides of the supporting object.

5. The windscreen wiper structure as claimed in claim 4, wherein a clip-buckle slot is concavely disposed on the two sides of the base plate of the centre stand, a clip-buckle body protrudes from each of an interior wall at opposite sides of the outer housing, and each clip-buckle body of the outer housing clips to a respective clip-buckle slot of the two sides of the base plate of the centre stand.

6. The windscreen wiper structure as claimed in claim 1, wherein the hook stand includes a stand body and two side parts respectively extending from corresponding sides of the stand body, and a hitching space is formed between the two side parts.

7. The windscreen wiper structure as claimed in claim 1, wherein two flexible objects are disposed on the upper surface of the supporting object, each of the two flexible objects having an outer rim forming an arced surface, each flexible object having two lower sides with a clip slot formed in each lower side, the two flexible objects being respectively clipped to a corresponding side of the supporting object via the clip slot making the two flexible objects fixed on two sides of the supporting object.

8. The windscreen wiper structure as claimed in claim 7, wherein two end lids are disposed on opposing ends of the supporting object, each end lid having an open interior forming a placing space, the placing space having two lower sides with a clip slot formed in each of the lower sides of the placing space, the clip slots of each of the two end lids being respectively clipped to one of two opposing ends of the supporting object, and an end of each of the two flexible objects being received in the placing space of a corresponding one of the two end lids.

9. A windscreen wiper structure, comprising;
a supporting object;
a windscreen wiper strip, fixed in a lower surface of the supporting object; and
a connecting device, the connecting device comprising:
- a centre stand being fixed in a middle of an upper surface of the supporting object and having an axle;
- a hook stand having a pivoting hole formed therein, the axle of the centre stand being received in the pivoting hole;
- an outer housing covering an exterior of the centre stand and having an opening hole formed in a top thereof and two housing sides, one end of the two housing sides having a pivoting axle extending therebetween, another end of each of the two housing sides having a first fixing buckle protruding from an interior surface thereof; and
- a lid body, removably covering the opening hole of the outer housing, the lid body having (a) an upper plate with a piercing hole formed in a top thereof, (b) a pivot stand formed on one end thereof, and (c) two side plates extending downwardly from opposing sides of the upper plate, each of the two side plates having a second fixing buckle formed thereon and extending past a lower edge thereof, the second fixing buckles being disposed in correspondence with a respective one of the first fixing buckles of the outer housing, the pivot stand of the lid body connects together with the pivoting axle of the outer housing, wherein the second fixing buckles respectively buckle together with the first fixing buckles when the lid body closes.

* * * * *